(12) United States Patent
Wang et al.

(10) Patent No.: US 10,513,376 B2
(45) Date of Patent: Dec. 24, 2019

(54) FRESHNESS PRESERVATION UNIT, STORAGE BOX, AND REFRIGERATOR

(71) Applicant: QINGDAO HAIER JOINT STOCK CO., LTD, Qingdao, Shandong (CN)

(72) Inventors: Yuegang Wang, Shandong (CN); Weiying Zhang, Shandong (CN); Min Li, Shandong (CN); Enwei Ding, Shandong (CN); Aimin Wang, Shandong (CN); Guoxin Yu, Shandong (CN)

(73) Assignee: Qindao Haier Joint Co., Ltd., Qingdao (CN)

( * ) Notice: Subject to any disclaimer, the term of this patent is extended or adjusted under 35 U.S.C. 154(b) by 273 days.

(21) Appl. No.: 15/528,651

(22) PCT Filed: May 30, 2015

(86) PCT No.: PCT/CN2015/080432
§ 371 (c)(1),
(2) Date: May 22, 2017

(87) PCT Pub. No.: WO2016/082506
PCT Pub. Date: Jun. 2, 2016

(65) Prior Publication Data
US 2017/0267426 A1    Sep. 21, 2017

(30) Foreign Application Priority Data

Nov. 28, 2014    (CN) .......................... 2014 1 0702153

(51) Int. Cl.
*A23B 7/00*    (2006.01)
*A23L 3/3418*    (2006.01)
(Continued)

(52) U.S. Cl.
CPC ............ *B65D 51/16* (2013.01); *A23B 7/0416* (2013.01); *A23L 3/3418* (2013.01); *A23L 3/3436* (2013.01);
(Continued)

(58) Field of Classification Search
CPC ............... B65D 5/541; B65D 21/0212; B65D 43/0254; B65D 51/16; B65D 2205/02;
(Continued)

(56) References Cited

U.S. PATENT DOCUMENTS

| | | |
|---|---|---|
| 2004/0031705 A1 | 2/2004 | DeTemple, II et al. |
| 2008/0116252 A1* | 5/2008 | Chou .................... B65D 5/541 229/164.2 |

(Continued)

FOREIGN PATENT DOCUMENTS

| | | |
|---|---|---|
| DE | 202013007581 U1 | 9/2013 |
| EP | 2336685 A2 | 6/2011 |

(Continued)

OTHER PUBLICATIONS

Electronic English translation of JPH0269170.
(Continued)

*Primary Examiner* — Minh Chau T Pham
(74) *Attorney, Agent, or Firm* — Ladas & Parry LLP

(57) ABSTRACT

Disclosed is a freshness preservation unit for a storage box of a refrigerator. At least one through hole is provided on at least one box wall of the storage box. The freshness preservation unit includes a housing wherein an accommodating space is formed. A freshness preservation film is provided in the accommodating space. The housing is provided with a fixing piece which is cooperatable with the box wall of the storage box such that the freshness preservation unit is assembled in the through hole of the storage box in a detachable manner. The freshness preservation unit realizes
(Continued)

the functions of freshness preservation and storage for fruits and vegetables, and is assembled in the through hole of the storage box in a detachable manner, convenient to assembly and disassembly, convenient to cleaning and replacement, and low in the maintenance cost.

12 Claims, 4 Drawing Sheets

(51) Int. Cl.
| | | |
|---|---|---|
| *B65D 51/16* | (2006.01) | |
| *B65D 81/22* | (2006.01) | |
| *F25D 25/02* | (2006.01) | |
| *A23B 7/04* | (2006.01) | |
| *F25D 25/00* | (2006.01) | |
| *A23L 3/3436* | (2006.01) | |
| *F25D 17/04* | (2006.01) | |

(52) U.S. Cl.
CPC ......... *F25D 17/042* (2013.01); *F25D 25/005* (2013.01); *F25D 25/02* (2013.01); *B65D 81/22* (2013.01); *B65D 2205/02* (2013.01); *F25D 2317/041* (2013.01); *F25D 2317/0413* (2013.01); *F25D 2317/061* (2013.01)

(58) Field of Classification Search
CPC ......... B65D 81/22; A23B 7/00; A23L 3/3418; F25D 17/042; F25D 2317/0413; F25D 2317/041
USPC .............. 55/385.1, 385.4; 206/461; 220/265; 229/164.2
See application file for complete search history.

(56) References Cited

U.S. PATENT DOCUMENTS

| | | | |
|---|---|---|---|
| 2015/0197374 A1* | 7/2015 | Simozar | B65D 21/0212 206/461 |
| 2016/0185490 A1* | 6/2016 | Wang | B65D 43/0254 220/265 |
| 2017/0321908 A1* | 11/2017 | Hua | A23B 7/00 |

FOREIGN PATENT DOCUMENTS

| | | |
|---|---|---|
| JP | S5471860 U | 5/1979 |
| JP | H0269170 A | 3/1990 |
| JP | H0771865 A | 3/1995 |
| JP | 2000180017 A | 6/2000 |
| JP | 2001174136 A | 6/2001 |
| JP | 2001248959 A | 9/2001 |

OTHER PUBLICATIONS

Electronic English translation of JPH0771865.
Electronic English translation of JP2000180017.
Electronic English translation of JP2001174136.
Electronic English translation of JP2001248959.
Electronic English translation of JPS5471860.
Electronic English translation of DE202013007581.
Examination Reports issued in foreign Counterpart Australian Patent Application No. 2015354142.
Examination Reports issued in foreign Counterpart European Patent Application No. 15862536.8.

* cited by examiner

FRESHNESS PRESERVATION UNIT, STORAGE BOX, AND REFRIGERATOR

This application is a national phase entry under 35 USC 371 of International patent application Ser. No.: PCT/CN2015/080432 filed on 30 May 2015, which claims priority from Chinese Application No. 201410702153.0, filed on Nov. 28, 2014, and entitled "Freshness-keeping function unit, preservation box and refrigerator", the disclosure of which is incorporated herein by reference in its entirety.

TECHNICAL FIELD

The present invention belongs to the technical field of household appliances, and particularly relates to a freshness preservation unit, a storage box and a refrigerator.

BACKGROUND OF THE INVENTION

In the electric refrigerator, separate storage boxes are generally arranged in a is cabinet thereof in order to ensure the freshness of food stored therein, such as fruit and vegetable boxes for storing fruits, vegetables, tea and so on. In order to keep fruits and vegetables fresh, there is a need to design the functionalities of the fruit and vegetable boxes, and a particular functional film is added onto at least one face of the fruit and vegetable boxes, so as improve humidity in the fruit and vegetable boxes, reduce condensation inside the box, and preserve freshness by air conditioning etc.

In the existing functional fruit and vegetable boxes, the method for adding the functional film is covering a particular face with a plastic part having a functional film. Since the structures of various fruit and vegetable boxes are different, in the process of manufacturing moulds, there is a need to separately manufacture moulds for a box body and a box cover of each fruit and vegetable box, and the plastic part having the functional film, so that manufacturing costs are high. Meanwhile, due to the relatively low strength of the functional film, it is more likely to be damaged during use, and if the functional film is formed integrally with the fruit and vegetable boxes, once the functional film is damaged, there is a need to replace the entire fruit and vegetable cover or fruit and vegetable box.

SUMMARY OF THE INVENTION

One object of the present invention is to provide a module of freshness preservation unit, which can achieve a function of preserving freshness of fruits to and vegetables by means of a fruit and vegetable storage box matched thereto; and during use, the module of freshness preservation unit is convenient to assemble and disassemble, to clean and replace, and has low maintenance costs.

It is another object of the invention to provide a storage box.

It is yet another object of the invention to provide a refrigerator.

In order to achieve one of the objects, provided in the present invention is a freshness preservation unit for use in a storage box of a refrigerator, at least one through hole being is provided on at least one box wall of the storage box, wherein the freshness preservation unit comprises a housing, an accommodating space is formed in the housing, a freshness preservation film is provided in the accommodating space, the housing is provided with a fixing piece, and the fixing piece is configured to be cooperatable with the box wall of the storage box such that the freshness preservation unit is assembled in the through hole of the storage box in a detachable manner.

As a further refinement of the invention, the housing comprises a first component and a second component which are formed separately and are assemblable and disassemblable, the first component comprises a first fence structure, the second component comprises a second fence structure, and when the first component and the second component are assembled, the accommodating space is formed between the first fence structure and the second fence structure.

As a further refinement of the invention, the freshness preservation film covers opposite surfaces of the second and first fence structures.

As a further refinement of the invention, the first component further comprises a fastener which is arranged on an outer periphery of the first fence structure, the second component further comprises an extension wall extending to from the second fence structure in a direction away from the first fence structure, and the fixing piece is arranged on an outer surface of the extension wall As a further refinement of the invention, after the first component and the second component are assembled, the fastener cooperates with the second fence structure to fix the relative position of the first and second components.

As a further refinement of the invention, the fixing piece is a retaining portion extending outward from the outer surface of the extension wall, and the retaining portion is provided at the end of the extension wall.

As a further refinement of the invention, the retaining portion is provided with an end face parallel to an inner surface of the box wall, and when the freshness preservation unit is assembled to the storage box, the end face comes into contact with the inner surface of the box wall.

As a further refinement of the invention, the freshness preservation unit may be a moisture permeation unit or an air-conditioning unit or a sterilization unit.

As a further refinement of the invention, the ratio of the total area of the freshness preservation unit to the volume of the storage box is in a range of 0.02-100.

In order to achieve the above-mentioned another object, provided in the present invention is a storage box, comprising a moisture permeation unit as mentioned above.

As a further refinement of the invention, when the freshness preservation unit is assembled to the storage box, the first component is configurable to protrude out of an upper surface of a box wall of the storage box, or to be half embedded into the box wall of the storage box, or to be fully embedded into the box wall of the storage box.

In order to achieve the above-mentioned yet another object, provided in the present invention is a refrigerator, comprising a storage box as mentioned above.

The beneficial effects of the present invention lie in: provided is a freshness preservation unit matching a storage box of a refrigerator to achieve a function of preserving freshness of fruits and vegetables, which is assembled in a through hole of the storage box, and during use, the module of freshness preservation unit is easy to assemble and disassemble, clean and replace, and has low maintenance costs; meanwhile, it is possible to distribute freshness preservation units and arrangements in accordance with the actual requirements, so that the pertinence and effectiveness of the units are improved.

DETAILED DESCRIPTION OF THE INVENTION

Figure 1:
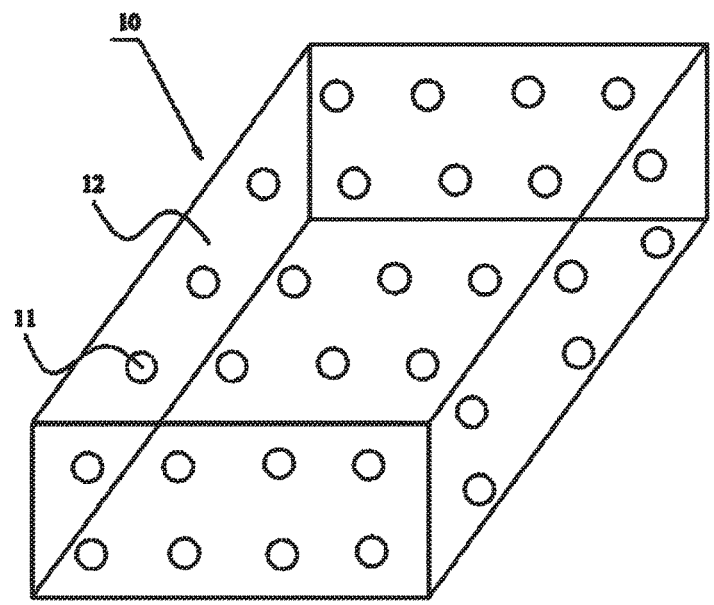
FIG. 1 is a structural schematic view of a specific embodiment of a storage box of the present invention.

The present invention will be described in detail below in conjunction with the embodiments shown in the drawings. However, the present invention is not limited to these embodiments, all the changes in the structure, method, or function made by a person skill in the art according to these embodiments should be included within the scope of protection of the present invention.

Reference is made to a specific embodiment of a storage box for use in a refrigerator shown in FIG. 1. For the storage box 10, at least one wall of the storage box 10 is provided with a plurality of unit holes 11, and a different unit is detachably assembled in each unit hole 11.

In the present embodiment, the units are divided into two types depending on whether they have the freshness preservation function, namely, freshness preservation units and sealing units (not shown), and both the shapes of the two types of units match the unit holes 11. In general, the freshness preservation units are detachably assembled in some of the unit within holes 11; and the sealing units are detachably assembled in the remaining unit holes 11. The freshness preservation units can also be divided into a moisture permeation unit, an air-conditioning unit, a sterilization unit and so on depending on the different composition of the functional film, and each of the freshness preservation units may be a corresponding unit for the particular function and may be a unit integrated with multiple functions. An air-conditioning functional film is provided in the air-conditioning unit, which is a silicon rubber film or a highly breathable microporous film, or a punctured film made by punching an ordinary plastic film. The silicon rubber film is an organosilicon polymer compound, a permeability to $CO_2$ is two hundred to three hundred times that of a polyethylene film, and for the selection of permeability of the silicone rubber film, the permeability to $CO_2$ is 5-6 times that to $O_2$ and 8-12 times that to $N_2$. $O_2$ required in the respiration process of the fruits and vegetables may slowly penetrate through the silicone rubber film, and $CO_2$ and ethylene may be automatically spread out, providing favorable conditions for fruit storage. The highly breathable microporous film is added with ceramic, calcium carbonate and fine silicon dioxide powder filler during the processing of the film processing, so as to control of the air permeability of the film; the punctured film made by punching an ordinary plastic film is such that holes with diameters in the range of 6-15 micrometers are punched in an ordinary film; and all the above films have a high permeability, to achieve a larger permeability to $CO_2$ than to $O_2$. The sterilization unit contains a paste, gel and powders etc. having a slowly released bactericidal composition, and the growth and reproduction of bacteria in the storage box 10 are inhibited by slowly releasing the bactericidal composition, thereby achieving a better freshness preservation effect. A moisture permeation functional film is arranged in the moisture permeation unit, which is a new type of polymer film, by controlling the moisture permeation functional membrane, it is possible to ensure a certain humidity to be maintained in the storage box 10, so as to avoid excessive water vapour from condensing into liquid water at a low temperature due to excessive humidity in the storage box 10, while preventing the water vapour from penetrating out of the storage box 10 when the humidity in the storage box 10 is low, so that the air drying of the fruits and vegetables in the box due to excessive moisture divergence is avoid; and the sealing unit is not provided with a freshness preservation functional film, functions to prevent the water vapour and other gas molecules from entering the storage box, and in fact is a closed unit hole 11.

Figure 2:
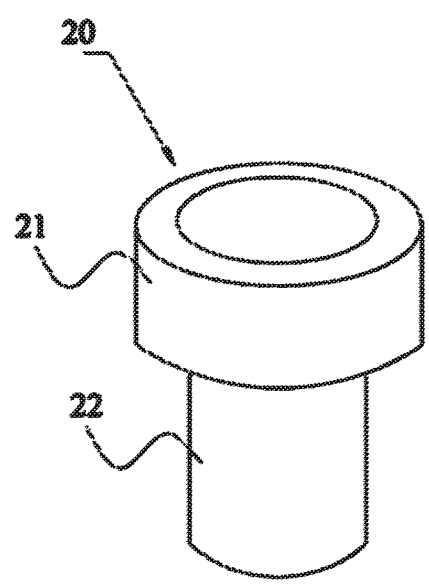
FIG. 2 is a structural schematic perspective view of a specific embodiment of the freshness preservation unit of the present invention.

Hereinafter, the freshness preservation units are described by way of example with each containing a moisture permeable film, and reference is made to a specific embodiment of shown in FIGS. 2-3b. The moisture permeation unit 20 includes a housing, an accommodating space is formed in the housing, a moisture permeation functional film 23 is provided in the accommodating space, and the housing is also provided with a fixing frame 25. In particular, the housing comprises a first component 21 and a second component 22; further, the first component 21 comprises a first fence structure 241, the second component 22 icy comprises a second fence structure 242, when the first component 21 and the second component 22 are assembled, the accommodating space is formed between the first fence structure 241 and the second fence structure 242, the moisture permeation functional film 23 is placed in the accommodating space, and the accommodating space is small enough so that moisture permeation is functional film 23 in this space covers opposite surfaces of the second fence structure 242 and the first fence structure 241.

Figure 3A:
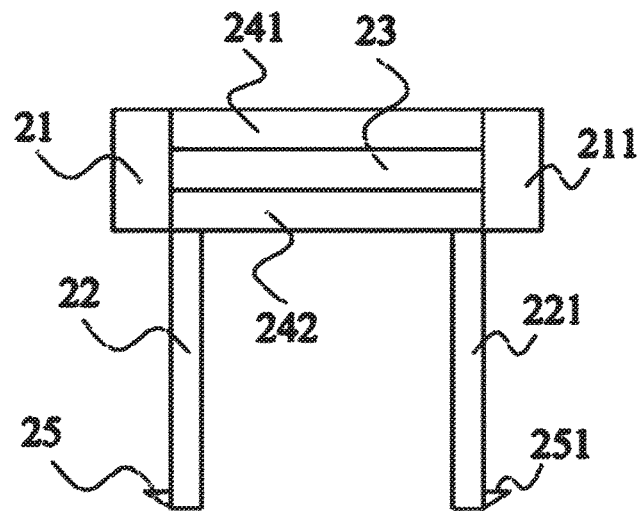
FIGS. 3a and 3b are sectional views of the freshness preservation unit shown in FIG. 1.
Figure 3B:
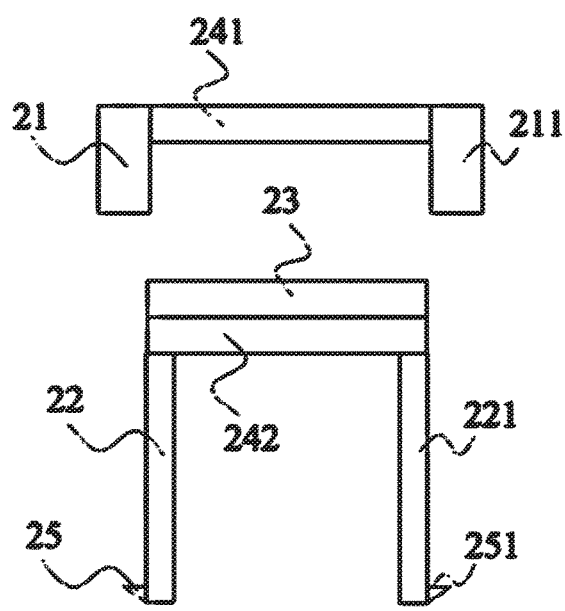

Referring to FIGS. 3a and 3b, the first component 21 and the second component 22 are formed separately and are assemblable and disassemblable, in order to replace the moisture permeation functional film 23 in the case that the moisture permeation functional film 23 is damaged. When the humidity is high in the storage box, the moisture permeability of the moisture permeation functional film 23 is increased, and when the humidity is low in the storage box, the moisture permeability of the moisture permeation functional film 23 is decreased. The moisture permeation functional film 23 will shrink or stretch with the change in moisture permeabilities, in the present invention, the first fence structure 241 and the second fence structure 242 are used to fix the moisture permeation functional film 23, so as to prevent the moisture permeation functional film 23 from falling off due to prolonged deformation, and to provide support and protection for the moisture permeation functional film 23. When the moisture permeation functional film 23 stretches, the moisture permeation functional film 23 is clamped by the first fence structure 241 and the second fence structure 242 to make it difficult to slack; and when moisture permeation functional film 23 shrinks, the first fence structure 241 and the second fence structure 242 can disperse shrinkage forces thereof. Both the first fence structure 241 and the second fence structure 242 have a mesh, which can effectively perform the moisture permeable function of the moisture permeation functional film 23.

In the present embodiment, both the first component 21 and the second icy component 22 are cylindrical, and of course, may also be elliptic columnar or square columnar or in other suitable shapes in other embodiments of the present invention. The first component 21 further comprises a fastener 211 which is arranged on an outer periphery of the first fence structure 241, after the first component 22 and second component 21 are assembled, the cooperation of the fastener 211 and the second fence structure 242 can fix the relative position of the first component 21 and the second component 22. The second component 22 further comprises an extension wall 221 extending from the second fence structure 242 in a direction away from the first fence structure 241, and the fixing piece 25 is disposed on the outer surface of the extension wall 221; preferably, the fixing piece 25 is a retaining portion extending outward from the surface of extension wall 221, and the retaining portion is provided at the end of the extension wall 221. The retaining portion is provided with an end face 251 parallel to the inner surface of the box wall 12, and when the moisture permeation unit 20 is assembled on the storage box 10, the end face 251 comes into contact with the inner surface of the box wall 12.

Preferably, the first component 21 and the second component 22 are made of a hard material, the moisture permeation functional film 23 is disposed therein, and this structure of the moisture permeation unit 20 has a higher structural strength and a longer service life and is more resistant to damage compared to a large-area moisture preservation module.

Figure 4A:
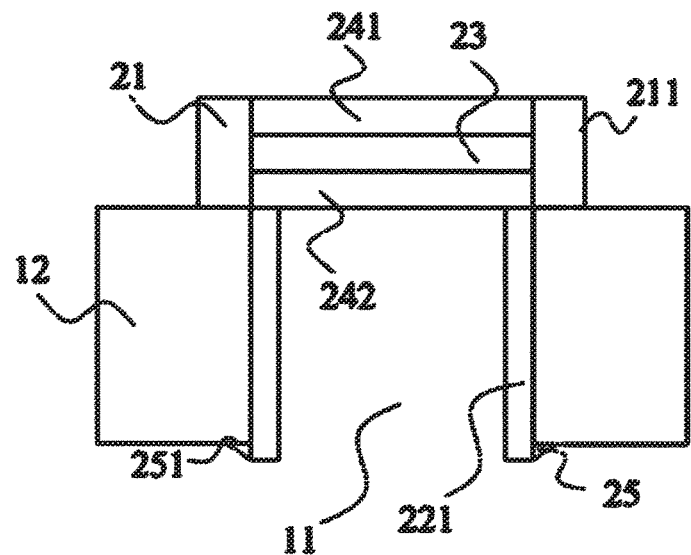
FIGS. 4a-4c are structural schematic views of three ways in which the freshness preservation unit shown in FIG. 1 is installed on the storage box of a refrigerator.
Figure 4B:
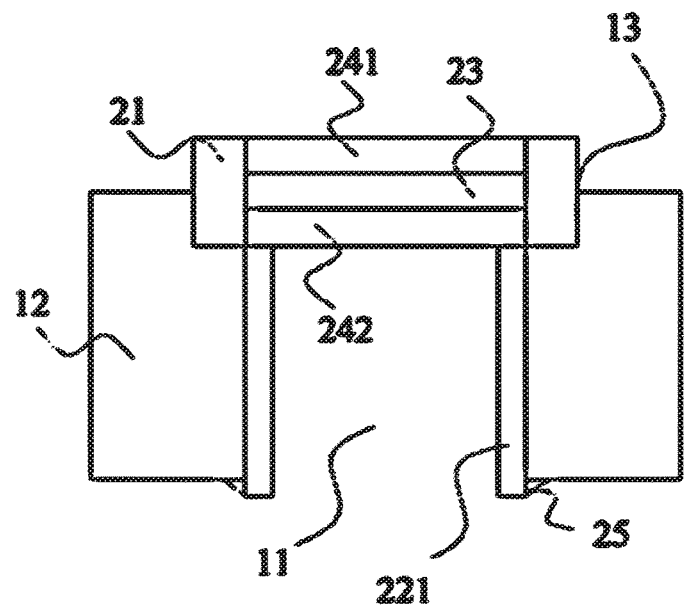
Figure 4C:
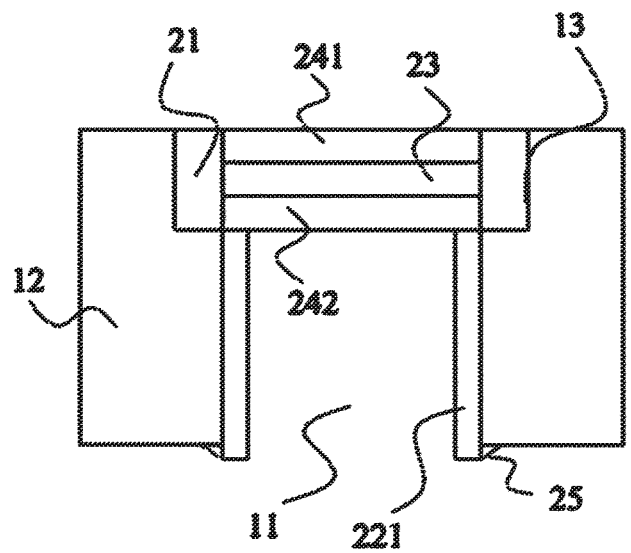

Referring to FIGS. 4a to 4c, there are three methods for fixedly installing the moisture permeation unit 20 and the box wall 12 of the storage box 10, namely, the first component 21 may protrude out of the box wall 12 of the storage box 10 (FIG. 4a) or half embedded into the box wall 12 of the storage box 10 (FIG. 4b) or fully embedded into the box wall 12 of the storage box 10 (FIG. 4c), and the shape of the opening in the box wall 12 of the storage box 10 matches the moisture permeation unit 20 no matter which fixed installation method is required. For example, if the required installation is such that the first component 21 protrudes out of the box wall of the storage box 10, only a through hole 11 needs to be provided in the box wall 12 of the storage box 10, the shape of the inner wall thereof is adapted to the extension wall 221 of the second component 22, when installing, the first component 21 comes into contact with the outer surface is of the box wall 10 of the storage box 12, and the retaining portion parallel to the end face of the inner surface of the box wall 12 comes into contact with the inner surface of the box wall 12; and if the required installation is such that the first component 21 half or fully embedded into the box wall 12 of the storage box 10, a groove 13, which is adapted to the first component 21, is provided on the inner wall of the through hole 11 of the box wall 12 of the storage box 10, when installing, the first component 21 is retained in the groove 13 of the through hole 11 of the box wall 12 of the storage box 10, and the retaining portion parallel to the end face of the inner surface of the box wall 12 comes into contact with the inner surface of the box wall 12.

Further, both the moisture permeation unit 20 and the sealing unit (not shown) are wrapped with an elastic gasket (not shown), or an elastic gasket may be provided within the unit hole 11 so that after it fits with the through holes 11 of the box wall 12 of the storage box 10, a better sealing performance can be achieved. The moisture permeation unit 20 and a module of sealing unit can be assembled with the storage box body 10 in a pressing manner, which is easier to assemble compared to conventional inserting, snap-fitting structures and the like, when cleaning, there is only need to disassemble, clean and re-install, and when part of the moisture permeation unit 20 is damaged, only the damaged unit needs to be replaced without scrapping the entire storage box, greatly reducing the maintenance cost after damage.

In the present embodiment, the storage box 10 is of a cubic structure, which includes six walls, and may be provided with multiple unit holes 11 on at least icy one wall according to the actual requirements, and the moisture permeation unit 20 and the sealing unit can be selectively filled into unit holes 11 as required. Due to the different air inlet positions of the refrigerator and different relative positions of the storage box and an evaporator of the direct cooling type refrigerator, the temperatures and relative humidities in various positions are different in the storage box. In general, the moisture permeation unit 20 is assembled in the unit hole 11 close to the evaporator (not shown) relative to the sealing unit. The storage box 10 is placed in the refrigerator cabinet (not shown), which necessarily has a part thereof close to the evaporator (not shown) or air inlet (not shown), the humidity in the place close to the evaporator or air inlet (not shown) is relatively large and moisture condensation is very easy to take place, and thus a hole is provided in the box wall 12 of the storage box body 10 close to the evaporator or the air inlet to be filled with the moisture permeation unit 20; a small amount of moisture condensation takes place at a distance from the evaporator or air inlet, and the moisture permeable membrane units 20 are filled at intervals in the holes in this area; and the moisture condensation substantially does not take place at a distance farther away the evaporator or air inlet, and thus no holes are provided in the box wall of the storage box body 10 in this area or the sealing units are directly filled, such that this region does not have the moisture permeable function. The moisture permeation unit 20 and the sealing unit are removably filled in the unit holes 11, that is to say, no matter what kind of refrigerator in which the storage box is located, there is no need to tack into account the position of the evaporator or air inlet in the refrigerator, the positions where the moisture permeation unit and the sealing unit are filled are adjusted according to the current position of the evaporator or air inlet in the refrigerator, so that a general-purpose storage box is obtained. The positions and arrangements of the moisture permeation units 20 are distributed in accordance with the actual requirements, so that the pertinence and effectiveness of the moisture permeation units are improved; meanwhile, the moisture permeation units can be applied to any face and position of the storage box body 10, have a more flexibility, can replace the currently-used large-area moisture preservation modules, and can achieve a better moisture preservation effect and inhibit the moisture condensation when applied to products such as the refrigerator. In this way, a storage box having different functions and different areas of functional films can be achieved without the need to manufacture moulds respectively for different functions and different areas of films, so that the manufacturing and processing costs are saved. The various units are distributed in the respective holes, reducing the waste of area of film when a conventional plastic part covers the entire functional film.

In addition, the number of unit holes 11 provided in the storage box 10 is considered in combination with the volume, functionalities and aesthetics of the storage box, the greater the volume of the storage box 10 and the more functionalities achieved, the greater the required number of unit holes 11, but the too dense unit holes 11 affect the aesthetics of the storage box, so that the number of unit holes 11 is within the range of 1 to 500.

Furthermore, the area of a single unit is considered together with the convenience for processing/installation/use, the functionality, the structural strength and so on of the unit, if the area of the single unit is too small, the operation during processing/installation/use is not convenient, the function is performed insufficiently, and excessive holes are provided; and if the area of the single freshness preservation unit is too large, the cost of replacement after damage is increased, the load-bearing capacity is decreased, and it is easy to be damaged. Thus, the area of the single unit should be in 1 $cm^2$-800 $cm^2$.

In addition, the total area of the units on the storage box is in a certain ratio to the volume of the storage box, and if the ratio of the total area of the units to the volume of the storage box is too large, a large number of units would be filled by the sealing units, resulting in waste; and if the ratio is too small, the freshness preservation function is relatively low. Therefore, the ratio (k, k=S/V) of the total area (S, in $cm^2$) of the units to the volume (V, in L) of the storage box is in the range of k=S/V=0.02-100.

In addition, the unit hole 11 may also be provided with a limiting structure 111, and the limiting structure 111 matches the shape of the freshness is preservation unit and the sealing unit and limits the freshness preservation unit and the sealing unit in the direction from the outside the storage box 10 to the inside of the storage box.

Figure 5A:
FIGS. 5a-5c are sectional views of a unit hole in the storage box shown in FIG. 1.
Figure 5B:
Figure 5C:

Referring to FIGS. 5a-5c, the limiting structure 111 of the unit hole 11 is a limiting portion protruding inward from an inner hole wall of the unit hole 11, after the freshness preservation unit and/or the sealing unit is assembled into the unit hole, the limiting portion bears the freshness preservation unit and/or the sealing unit in the axial direction of the unit hole. In particular, the sectional structure of the unit hole 11 with the limiting structure 111 may be funnel-shaped (FIG. 5a) or L-shaped (FIG. 5b); and the limiting structure 111 can also be formed by a recess of the inner hole wall of the unit hole 11, and in particular, the sectional structure of the unit hole 11 with the limiting structure 111 may be arc-shaped (FIG. 5c). Of course, in other embodiments, the sectional structure of the unit hole 11 may also be moulded into other suitable shapes.

It should be noted that the axial length of the freshness preservation unit and the sealing unit is equal to that of the unit hole 11, that is to say, when the freshness preservation unit and/or the sealing unit are assembled in the unit hole, the end face of the freshness preservation unit and/or the sealing unit close to the outside of the storage box 10 is in flush with the outer surface of the corresponding wall of the storage box 10 without protrusions, which will not affect the slipping of the storage box 10 in the refrigerator cabinet.

The present invention further provides a refrigerator (not shown), which employs the storage box and the freshness preservation unit as described in the above various embodiments and therefore can obtain the beneficial effects of the storage box and the freshness preservation unit as described In the above various embodiments, and since other structures or functions of refrigerator are not improved, the other structures of the refrigerator will not be repeatedly described here.

For a person skilled in the art, it is clear that the present invention is not limited to the details of the above exemplary embodiments, and the present invention can be implemented in other specific forms without departing from the spirit or essential features of the present invention. Hence, no matter from what point of view, the above exemplary embodiments should be considered to be exemplary and non-restrictive, the scope of the present invention is defined by the appended claims rather than the foregoing description, and therefore all changes intended to fall into the meaning scope of equivalent elements of the claims should be included in the present invention. Any reference signs in the claims should not be taken to limit the involved claims.

In addition, it should be understood that, although the description is given according to the embodiments, each embodiment does not only comprise an independent technical solution, this narrative description is merely for clarity, and for a person skilled in the art, the description shall be regarded as a whole, and the technical solution yin each of the embodiments can also be properly combined to form other embodiments that can be understood by a person skilled in the art.

What is claimed is:

1. A freshness preservation unit for use in a storage box of a refrigerator, wherein the freshness preservation unit comprises a housing, an accommodating space is formed in the housing, a freshness preservation film is provided in the accommodating space, the housing is provided with a fixing piece, and the fixing piece is configured to be cooperatable with the box wall of the storage box such that the freshness preservation unit is assembled in a through hole of the storage box in a detachable manner, wherein the storage box is a cubic structure including six box walls,
at least one box wall of the storage box is provided with a plurality of the through holes,
a shape of the freshness preservation unit matches the through hole, and
a plurality of the freshness preservation units can be selectively filled into different through holes as required according to corresponding position of an evaporator or an air inlet in a refrigerator and according to a corresponding relative position of the storage box, so that a general-purpose storage box with a variable position in a refrigerator is thereby obtained.

2. The freshness preservation unit according to claim 1, wherein the housing comprises a first component and a second component which are formed separately and are assemblable and disassemblable, the first component comprises a first fence structure, the second component comprises a second fence structure, and when the first component and the second component are assembled, the accommodating space is formed between the first fence structure and the second fence structure.

3. The freshness preservation unit according to claim 2, wherein the freshness preservation film covers opposite surfaces of the second and first fence structures.

4. The freshness preservation unit according to claim 2, wherein the first component further comprises a fastener which is arranged on an outer periphery of the first fence structure, the second component further comprises an extension wall extending from the second fence structure in a direction away from the first fence structure, and the fixing piece is arranged on an outer surface of the extension wall.

5. The freshness preservation unit according to claim 4, wherein after the first component and the second component are assembled, the fastener cooperates with the second fence structure to fix the relative position of the first and second components.

6. The freshness preservation unit according to claim 4, wherein the fixing piece is a retaining portion extending outward from the outer surface of the extension wall, and the retaining portion is provided at the end of the extension wall.

7. The freshness preservation unit according to claim 6, wherein the retaining portion is provided with an end face parallel to an inner surface of the box wall, and when the freshness preservation unit is assembled to the storage box, the end face comes into contact with the inner surface of the box wall.

8. The freshness preservation unit according to claim 1, wherein the freshness preservation unit may be a moisture permeation unit or an air-conditioning unit or a sterilization unit.

9. The freshness preservation unit according to claim 1, wherein the ratio of the total area of the freshness preservation unit to the volume of the storage box is in a range of 0.02-100.

10. A storage box for use in a refrigerator, comprising a freshness preservation unit of claim 1, wherein
- the storage box is a cubic structure including six box walls,
- at least one box wall of the storage box is provided with a plurality of unit holes, and
- a plurality of the freshness preservation units can be selectively filled into different unit hole as required according to corresponding positions of an evaporator or an air inlet in a refrigerator and according to a corresponding relative position of the storage box, so that a general-purpose storage box with a variable position in a refrigerator is thereby obtained.

11. The storage box according to claim 10, wherein when the freshness preservation unit is assembled to the storage box, the first component is configurable to protrude out of an upper surface of a box wall of the storage box, or to be half embedded into the box wall of the storage box, or to be fully embedded into the box wall of the storage box.

12. A refrigerator, comprising a storage box as claimed in claim 10.

* * * * *